United States Patent [19]

Morioka et al.

[11] Patent Number: 4,818,388
[45] Date of Patent: Apr. 4, 1989

[54] PAINT WASTE SEPARATING AND COLLECTING APPARATUS

[75] Inventors: Koji Morioka; Makoto Watanabe, both of Tokyo, Japan

[73] Assignee: Taikisha Ltd., Tokyo, Japan

[21] Appl. No.: 130,111

[22] Filed: Dec. 8, 1987

[30] Foreign Application Priority Data

Dec. 9, 1986 [JP] Japan ............................ 61-293675
Dec. 11, 1986 [JP] Japan ......................... 61-191309[U]

[51] Int. Cl.⁴ .................................................. C02F 1/40
[52] U.S. Cl. ................................. 210/167; 210/195.1; 210/197; 210/237; 210/255; 55/DIG. 46
[58] Field of Search ............. 55/DIG. 46; 210/167, 210/197, 237, 255, 295, 525, 195.1

[56] References Cited

U.S. PATENT DOCUMENTS

| | | | |
|---|---|---|---|
| 3,173,879 | 3/1965 | Arnold et al. ................. | 55/DIG. 46 |
| 3,764,073 | 10/1973 | Eisenmann ..................... | 210/705 |
| 3,772,190 | 11/1973 | Eisenmann ..................... | 210/255 |
| 4,100,066 | 7/1978 | Bloomer et al. ............... | 210/112 |
| 4,189,386 | 2/1980 | Aman ................................ | 210/237 |
| 4,470,905 | 9/1985 | Pangburn et al. ............. | 210/523 |
| 4,585,557 | 4/1986 | Turnquist ...................... | 210/525 |
| 4,722,791 | 2/1988 | Turnquist ...................... | 210/525 |

Primary Examiner—Peter Hruskoci
Attorney, Agent, or Firm—Webb, Burden, Ziesenheim & Webb

[57] ABSTRACT

A paint waste separating and collecting apparatus comprising a separator tank for receiving cleaning water laden with paint waste and discharged from a cleaning device, and a circulating passage for supplying cleaning water stripped of the paint waste from the separator tank to the cleaning device. The apparatus further comprises a first weir for allowing floating paint waste to flow together with overflow water from the separator tank, an auxiliary separator tank for receiving the overflow water from the first weir, a second weir for allowing the floating paint waste to flow together with overflow water from the auxiliary separator tank, a collector vessel for receiving the overflow water from the second weir and separating the paint waste from the overflow water, a recovery tank for accommodating the collector vessel, a first return passage for returning cleaning water stripped of the paint waste from the auxiliary separator tank to one of the separator tank and the cleaning device, and a second return passage for returning cleaning water stripped of the paint waste from the recovery tank to one of the auxiliary separator tank and the separator tank.

6 Claims, 12 Drawing Sheets

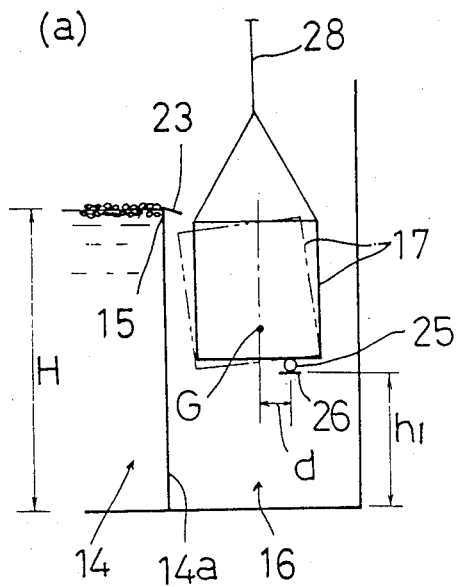
FIG.12 (a)
FIG.12(b)
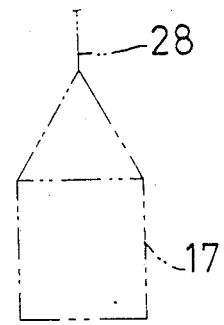
FIG.13
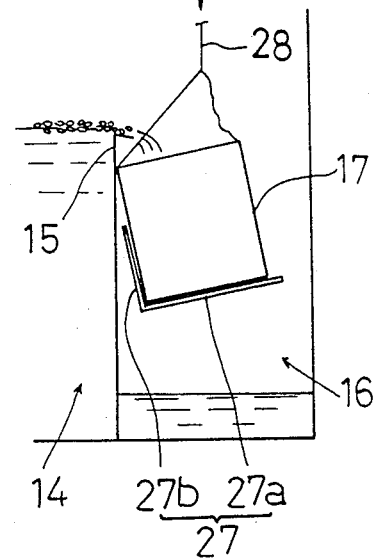
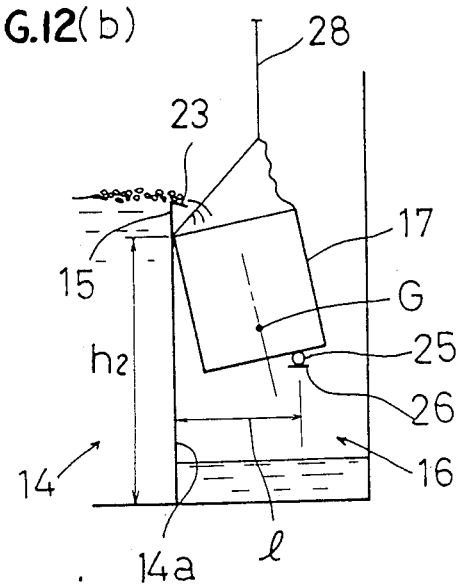

PAINT WASTE SEPARATING AND COLLECTING APPARATUS

BACKGROUND OF THE INVENTION (1) Field of the Invention

The present invention relates to a paint waste separating and collecting apparatus for use with a spraying booth. More particularly, the spraying booth includes a cleaning device for receiving an exhaust gas laden with overspray mist and paint waste solids falling from a booth floor, and for discharging such paint waste by means of cleaning water. The paint waste separating and collecting apparatus comprises a separator tank for receiving the cleaning water discharged from the cleaning device and allowing the paint waste to float and separate from the cleaning water, and a circulating passage for returning the cleaning water stripped of the paint waste from the separator tank to the cleaning device thereby to recycle the cleaning water.

(2) Description of the Prior Art

In known paint waste separating and collecting apparatus as noted above, paint waste accumulated in flotation in the separator tank is directly transferred to a collector vessel by controlling a water level of the separator tank, or a flotation tank is provided between the spraying booth and the separator tank and paint waste is transferred from the flotation tank through the separator tank to a collector vessel. Such an apparatus is disclosed in U.S. Pat. No. 4,100,066, for example. In this prior apparatus, paint laden cleaning water is caused to flow upward from a bottom of the separator tank. The water level is controlled by a complicated operation of a plurality of valves mounted on pipes connected to the separator tank. Further, a bubbling dvice is provided to promote flotation and collection of paint waste sediments in the separator tank.

The above apparatus, however, has a complicated construction and is prone to run into trouble as a result of the paint waste clogging the valves, for example, which necessitates frequent maintenance operations. The apparatus also has the disadvantage of involving a complicated valve operation for controlling the water level.

Particularly where the flotation tank is not provided between the spraying booth and the separator tank and the paint waste is transferred directly from the separator tank to the collector vessel, trouble in the water level control system or in the transportation of the collector vessel into and out of the apparatus would require the circulation of the cleaning water and the operation of the separator tank to be stopped for repair work. Since the cleaning device must be stopped during the repair operation, a spraying line must also be put out of operation in the case of a continuous spraying booth, for example.

SUMMARY OF THE INVENTION

Having regard to the disadvantages of the prior art noted above, the object of the present invention is to provide a rational improvement to realize a relatively simple apparatus for collecting the floating paint waste and circulating the cleaning water, thereby to stabilize the cleaning water circulation through the cleaning device and to enable efficient paint waste separation and collection.

The above object is achieved according to the present invention by a paint waste separating and collecting apparatus comprising a separator tank for receiving cleaning water laden with paint waste and discharged from a cleaning device, and a circulating passage for supplying cleaning water stripped of the paint waste from the separator tank to the cleaning device, the apparatus further comprising a first weir for allowing floating paint waste to flow together with overflow water from the separator tank, an auxiliary separator tank for receiving the overflow water from the first weir, a second weir for allowing the floating paint waste to flow together with overflow water from the auxiliary separator tank, a collector vessel for receiving the overflow water from the second weir and separating the paint waste from the overflow water, a recovery tank for accommodating the collector vessel, a first return passage for returning cleaning water stripped of the paint waste from the auxiliary separator tank to one of the separator tank and the cleaning device, and a second return passage for returning cleaning water stripped of the paint waste from the recovery tank to one of the auxiliary separator tank and the separator tank.

In the above apparatus, the paint waste afloat in the auxiliary separator tank is transferred through the second weir to the collector vessel. Therefore, in the event that trouble in the handling of the collector vessel forbids the floating paint waste to be transferred to the collector vessel, it is necessary for the repair operation only to stop water flows from the separator tank to the auxiliary separator tank through the first weir. Only the auxiliary separator tank has a limited water surface area in order to efficiently transfer the floating paint waste to the collector vessel which has a limited size. The separator tank is allowed to have a large capacity to accommodate a large amount of paint waste in flotation. During the repair operation, therefore, the circulation of the cleaning water through the cleaning device may be continued with the flotation and separation of the paint waste in the separator tank maintained in a normal or near normal state.

Further, in the apparatus according to the invention, the cleaning water is caused to flow from the separator tank to the auxiliary separator tank through the first weir by returning the cleaning water stripped of the paint waste from the auxiliary separator tank to the separator tank or to the cleaning device through the first return passage. Thus, the cleaning device receives the circulation of cleaning water in a constant amount whether the cleaning water is flowing to the auxiliary separator tank or not. The cleaning device receives the same amount of cleaning water as at normal times during a repair operation as well, with the water flow to the auxiliary separator tank stopped and the recirculation of cleaning water to the cleaning device continued as described above.

With regard to the efficiency of separating and collecting the paint waste, the cleaning water overflows the first weir from the separator tank to the auxiliary separator tank, and air bubbles become entrained in the overflows entering the auxiliary separator tank. This produces an effect similar to that produced in the known apparatus including a bubbling device for promoting flotation of the paint waste. The present invention is able to promote flotation and separation of the paint waste without such a bubbling device.

The cleaning water stripped of the paint waste and collected in the recovery tank accommodating the collector vessel is returned through the second return passage to the separator tank or to the auxiliary separator tank. This provides a circulation of the cleaning water separate from the cleaning water circulation between the cleaning device and the separator tank. Consequently, fine paint particles remaining at large after one state of water circulation for paint waste separation and collection are allowed to grow into paint solids sufficiently large to float and separate from the water for capture in the next stage of water circulation. This, together with the flotation of the paint waste promoted by the air bubbles as noted above, achieves highly efficient paint waste separation and collection.

The apparatus according to the invention does not employ valves which may be clogged by the paint waste. Consequently, its maintenance is relatively easy and the water level control is effected with a simple operation.

Thus, the present invention provides a highly reliable paint waste separating and collecting apparatus for use with a spraying equipment, which as ancilliary installation to the main or spraying equipment enables the latter to operate steadily. This paint waste separating and collecting apparatus allows the cleaning device to operate continuously and stably, and does not require the spraying line to stop operating for the paint waste to be collected in the separating and collecting apparatus.

This apparatus having high paint waste separating and collecting efficiency has an advantage in terms of running cost as well in that the apparatus is capable of saving an amount of fresh cleaning water supply and mitigating maintenance for removal paint waste adhering to the apparatus. The high paint waste separating and collecting efficiency is achieved through only a relatively simple improvement in the circulation of cleaning water stripped of the paint waste. This paint waste separating and collecting apparatus, therefore, has the advantage of low manufacturing cost as well.

Other features and advantages of the present invention will be apparent from the following description.

BRIEF DESCRIPTION OF THE DRAWINGS

FIG. 13 is a view illustrating another example of collector vessel.

DETAILED DESCRIPTION OF THE PREFERRED EMBODIMENTS

An embodiment of the present invention will be described hereinafter with reference to the drawings.

Figure 1:
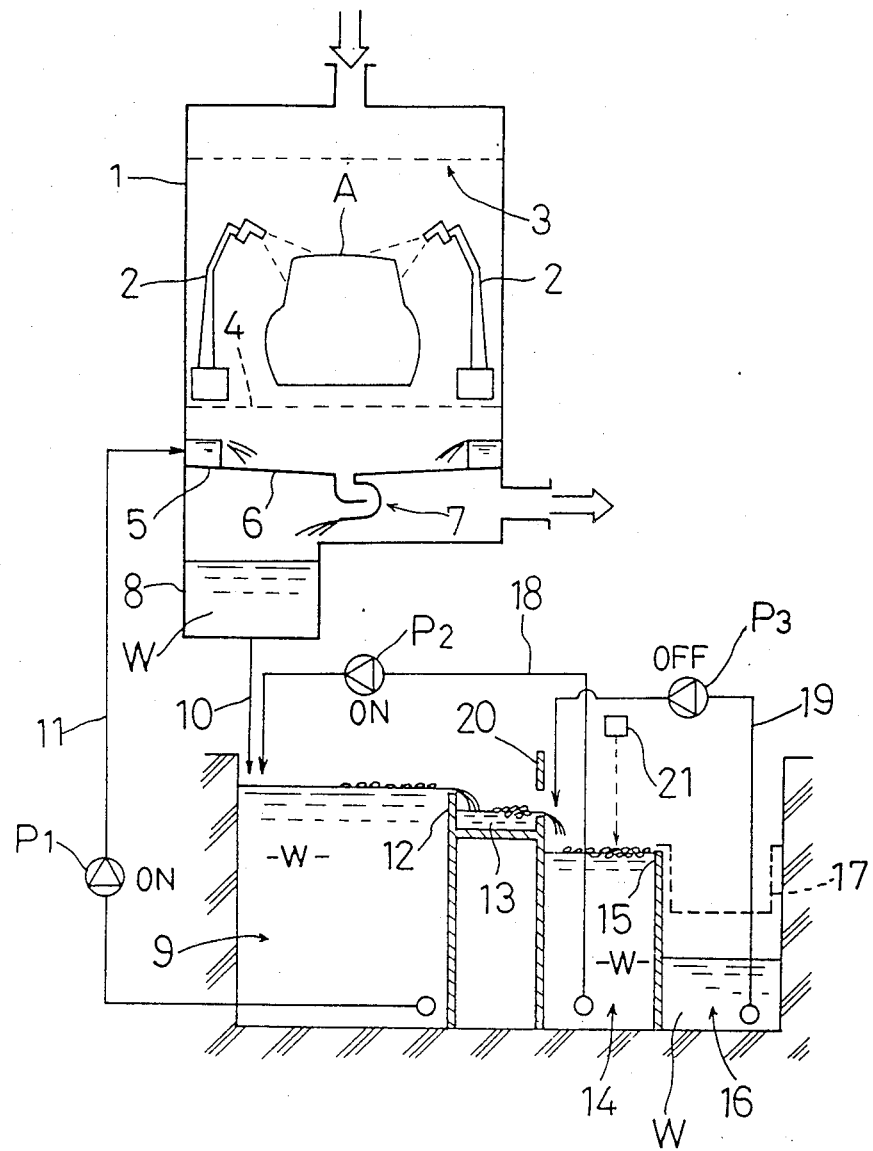
FIG. 1 is a system diagram of a paint waste separating and collecting apparatus embodying the present invention.

Referring to FIG. 1, number 1 indicates a spraying booth. The spraying booth 1 houses spraying robots 2 arranged along both sides of a conveying track of articles A under spraying treatment. Ventilating air is supplied downwardly in laminar flows from ceiling openings 3 into a spraying region, and air laden with overspray paint mist is forcibly exhausted through a grated floor 4 outwardly of the spraying booth 1.

Troughs 5 are provided under the grated floor 4, and cleaning water W overflowing the troughs 5 flows down a pan 6 carrying paint waste solids falling from the grated floor 4 to the pan 6.

The pan 6 includes partition walls defining a bending constriction passage 7 forming part of a forcible air exhaust line from the spraying region. The exhaust air flows through the passage 7 at high speed, confluently with the cleaning water W which has flowed down the pan 6. During the high speed passage, the overspray paint mist contained in the exhaust air is captured by the cleaning water W.

A reservoir 8 is disposed below the pan 6 for receiving the cleaning water W laden with the overspray paint mist as well as the paint waste solids flowing down with the cleaning water W. The troughs 5, pan 6, bending constriction passage 7 and reservoir 8 constitute a cleaning device for removing by means of the cleaning water W the paint waste exhausted from the booth 1.

Figure 2:
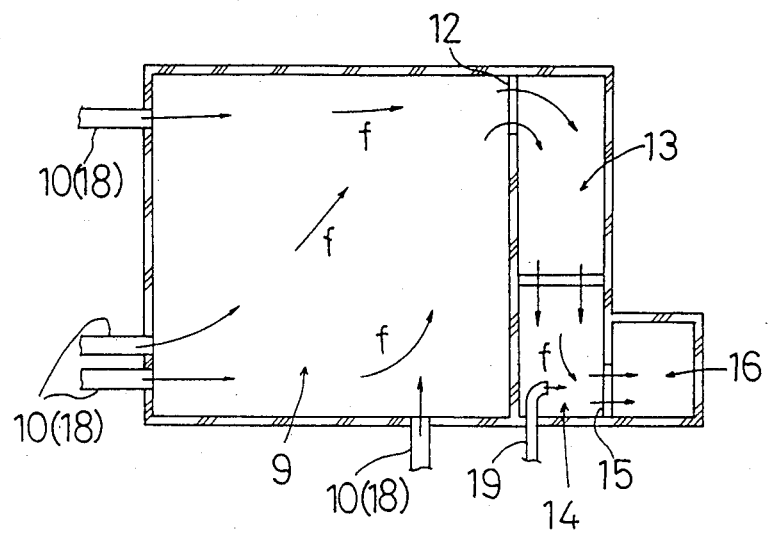
FIG. 2 is a plan view of the apparatus.

As shown in FIGS. 1 and 2, a separator tank 9 is provided as equipment associated with the spraying booth 1. The cleaning water W in the reservoir 8 flows by gravity with the paint waste contained therein through a passage 10 to the separator tank 9. The paint waste is allowed to float and separate from the cleaning water W stored in the separator tank 9.

The cleaning water W stripped of the paint waste is continuously fed to the troughs 5 of the cleaning device through a circulating passage 11 including a first pump P1, for repeated use in the cleaning device.

The separator tank 9 includes a wall defining a first weir 12 for allowing the floating paint waste to leave the separator tank 9 together with overflowing water. The water overflowing the first weir 12 flows through a passage 13 to an auxiliary separator tank 14 disposed next to the separator tank 9.

The auxiliary separator tank 14 includes a wall defining a second weir 15 for allowing floating paint waste to leave the auxiliary separator tank 14 together with overflowing water. A recovery tank 16 is disposed next to the auxiliary separator tank 14, which contains a collector vessel 17 formed of netting to receive the water overflowing the second weir 15 and separate the paint waste from the water.

The cleaning water W stripped of the paint waste in the auxiliary separator tank 14 is returned to the separator tank 9 through a first return passage 18 including a second pump P2. The cleaning water in the recovery tank 16 having passed the collector vessel 17 is returned to the auxiliary separator tank 14 through a second return passage 19 including a third pump P3. The arrangement from the separator tank 9 to the recovery tank 16 is used to separate and collect the paint waste from the cleaning water W as follows.

FIG. 1 shows a normal operating state, in which the first pump P1 is operated to keep the cleaning water W in circulation between the cleaning device of booth 1 and the separator tank 9. The cleaning water W stripped of the paint waste is continuously supplied to the cleaning device.

Further, the second pump P2 is operated to continuously return the cleaning water W from the auxiliary separator tank 14 to the separator tank 9. As a result, the water continues to overflow the first weir 12 and carry the floating paint waste from the separator tank 9 to the auxiliary separator tank 14.

In this state the third pump P3 is out of operation and there is no overflow of water at the second weir 15.

In FIG. 1 and other figures, the letters "ON" signifies the operative state of the pumps and "OFF" signifies the inoperative state thereof.

Figure 3:
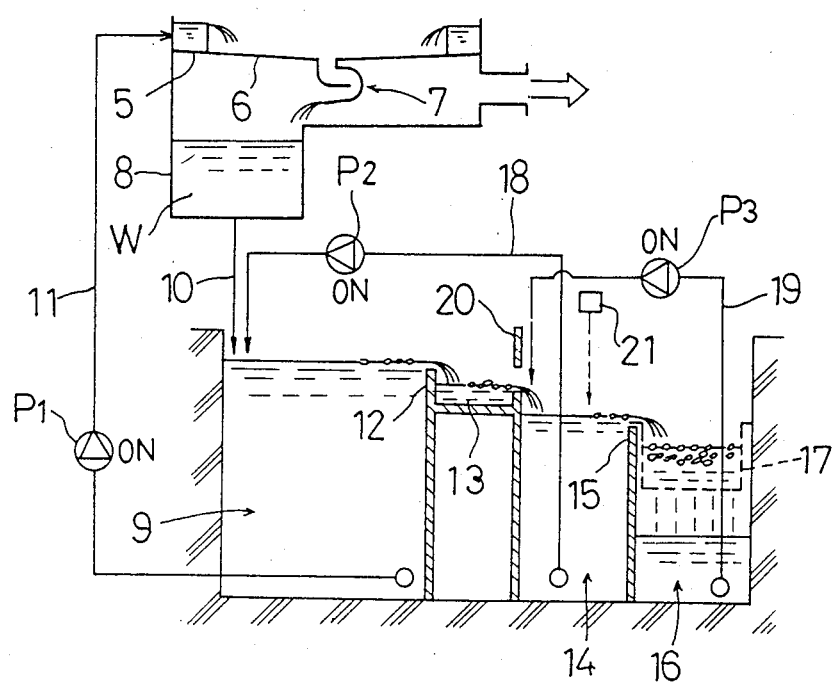
FIGS. 3 through 7 are explanatory views of operating modes of the apparatus, respectively, FIGS. 8 (a) through (e) are explanatory views of operating modes of another embodiment of the invention, FIGS. 9 (a) through (d) are explanatory views of operating modes of a further embodiment of the invention.

FIG. 3 shows a state in which collection of the floating paint waste is commenced. The third pump P3 is brought into operation when a certain amount of floating paint waste accumulates in the auxiliary separator tank 14 as a result of the normal operation.

The third pump P3 returns the cleaning water W stored in the recovery tank 16 to the auxiliary separator tank 14. As a result, the water begins to overflow the second weir 15 and carry the floating paint waste from the auxiliary separator tank 14 to the collector vessel 17 where the the paint waste is collected and dewatered.

Figure 4:
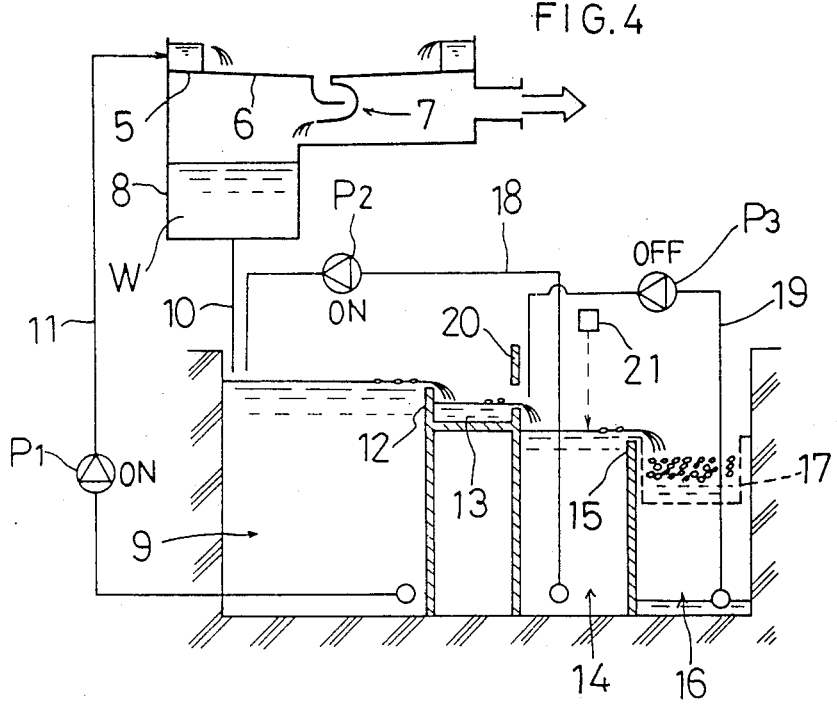
Figure 5:
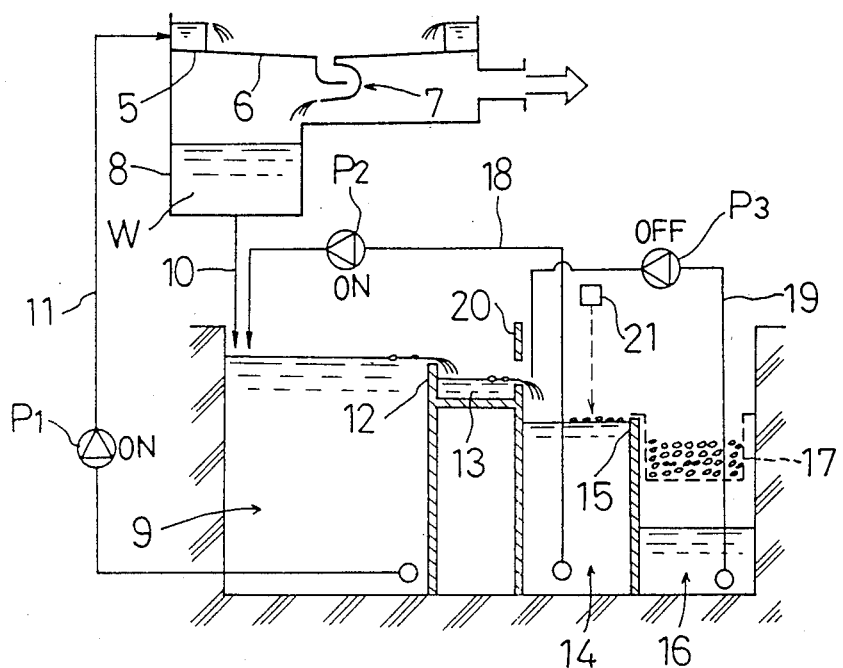

As shown in FIG. 4, the third pump P3 is stopped when most of the floating paint waste is transferred from the auxiliary separator tank 14 to the collector vessel 17. Then the water stops overflowing the second weir 15 as shown in FIG. 5. After the paint waste is dewatered, the collector vessel 17 is removed to dispose of the collected paint waste. The collector vessel 17 is reinstated in the recovery tank 16 and the normal operation shown in FIG. 1 is resumed.

As shown in FIGS. 3 through 5, the first pump P1 and second pump P2 are kept in operation during the transfer of the floating paint waste from the auxiliary separator tank 14 to the collector vessel 17, to continue to return the cleaning water W to the cleaning device and to transfer the floating paint waste from the separator tank 9 to the auxiliary separator tank 14.

Figure 6:
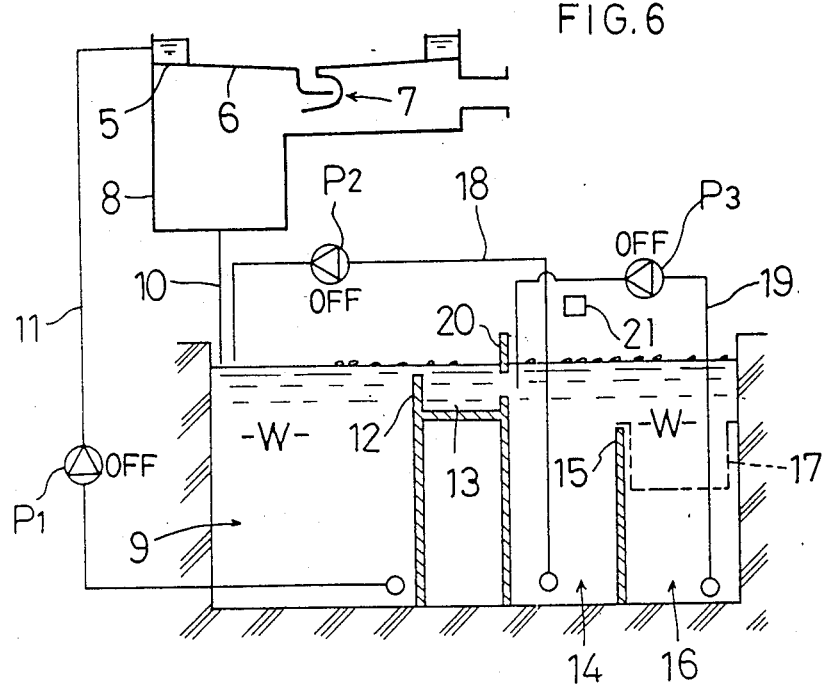

FIG. 6 shows a state in which the cleaning water processing is stopped with the spraying booth 1 having ceased operating. All of the pumps P1, P2 and P3 are stopped and all or part of the cleaning water W stored in the reservoir 8 of the cleaning device falls to the separator tank 9. As a result, the separator tank 9, auxiliary separator tank 14 and recovery tank 16 together have a high water level. A partition plate 20 is provided at a position where the water overflowing the first weir 12 enters the auxiliary separator tank 14, thereby to stop backflow to the separator tank 9 of the floating paint waste having moved to the auxiliary separator tank 14 and recovery tank 16.

In FIG. 6 the collector vessel 17 is immersed in the water, but may be raised above the water surface when the booth is out of operation.

Figure 7:
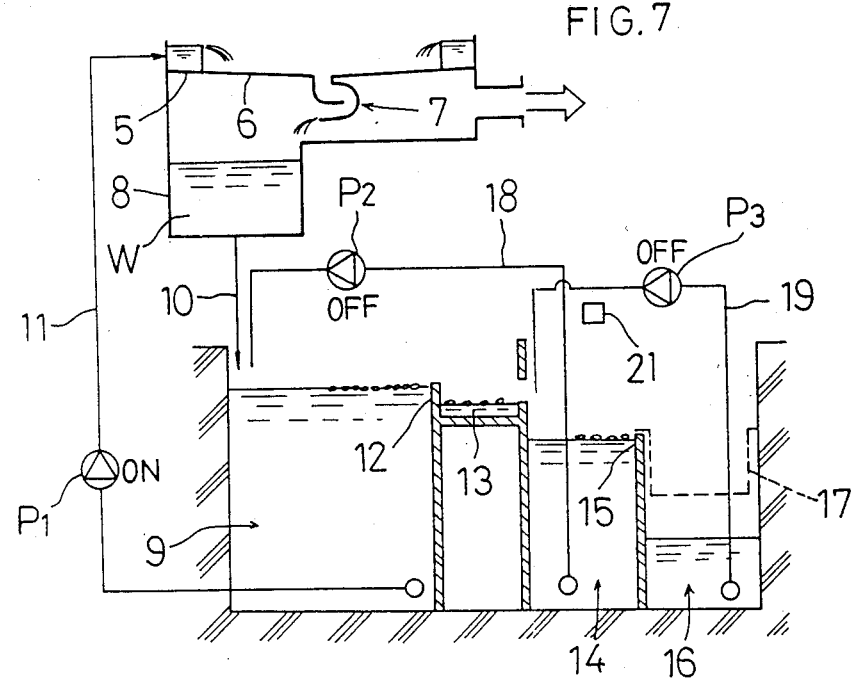

The third pump P3 for transferring the floating paint waste from the auxiliary separator tank 14 to the collector vessel 17 is automatically operable in response to information provided by a water surface monitoring sensor 21 of the ultrasonic or other type associated with the auxiliary separator tank 14. A situation may arise where the floating paint waste in the auxiliary separator tank 14 cannot be transferred to the collector vessel 17 because of the water surface sensor 21 inadvertently becoming inoperative or beginning to malfunction or because of other truble. It is then necessary to repair the trouble while stopping further accumulation of the floating paint waste in the auxiliary separator tank 14. The repair is carried out as shown in FIG. 7. During the repair operation the second pump P2 is stopped to prevent the water in the separator tank 9 from overflowing to the auxiliary separator tank 14, but the first pump P1 is kept running to continuously cause the paint waste to float and separate from the cleaning water W in the separator tank 9 and to supply the cleaning water W to the cleaning device.

The separator tank 9 has a storage capacity ten-odd to several tens times that of the auxiliary separator tank 14, and has a much larger capacity to allow the paint waste to float therein than the auxiliary separator tank 14. Consequently, no problem will arise where the paint waste is allowed to float and separate from the cleaning water W in the separator tank 9 by circulating the cleaning water W between the cleaning device and the separator tank 9 for a long time, with the floating paint waste stopped flowing from the separator tank 9 to the auxiliary separator tank 14.

The passage 10 for supplying the cleaning water W from the reservoir 8 of the cleaning device to the separator tank 9 and the first return passage 18 for returning the cleaning water W from the auxiliary separator tank 14 to the separator tank 9, have outlets arranged as shown in FIG. 2. This arrangement causes the incoming cleaning water W to form surface flows f over a large area of the water stored in the separator tank 9, which flows are directed to the first weir 12.

More particularly, the first weir 12 is localized to a tank wall part in order to collect the floating paint waste in the separator tank 9 but this results in certain positions of the water surface where the paint waste tends to stagnate. To avoid such a situation, the incoming cleaning water W is utilized to create surface flows f over a large area directed toward the first weir 12. This arrangement is effective to eliminate the stagnant floating paint waste thereby to improve the efficiency of separating and collecting the paint waste.

Similarly, the second return passage 19 has an outlet opening into the auxiliary separator tank 14 so as to cause the incoming cleaning water W to form surface flows f directed to the second weir 15, thereby to promote outflow of the floating paint waste to the collector vessel 17.

Another embodiment of the present invention will be described hereinafter.

Figure 8:
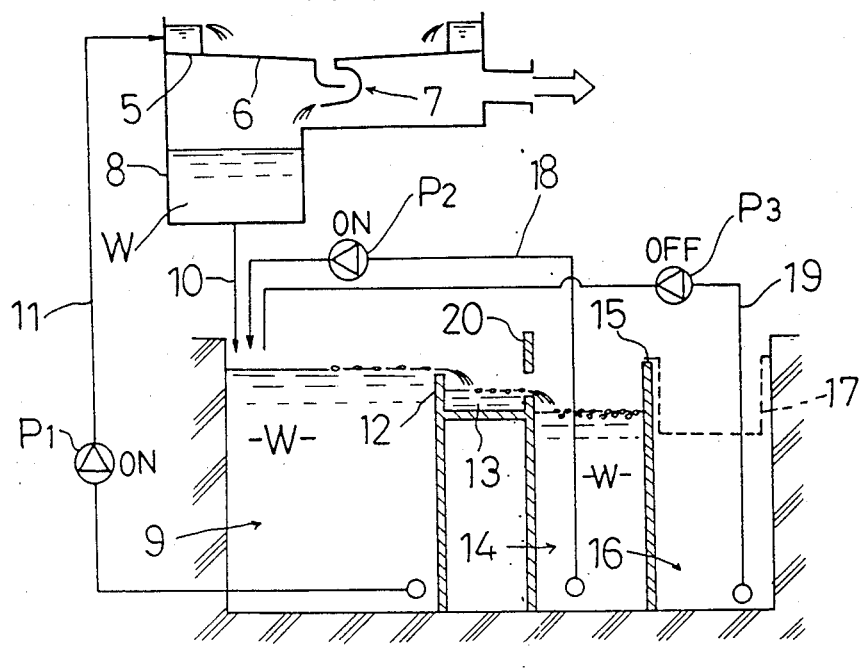
Figure 8:
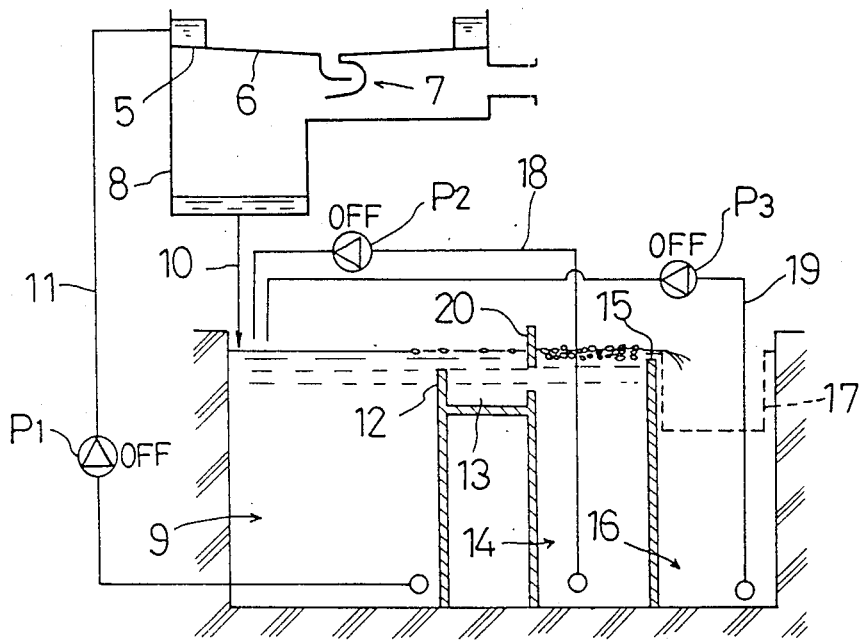
Figure 8:
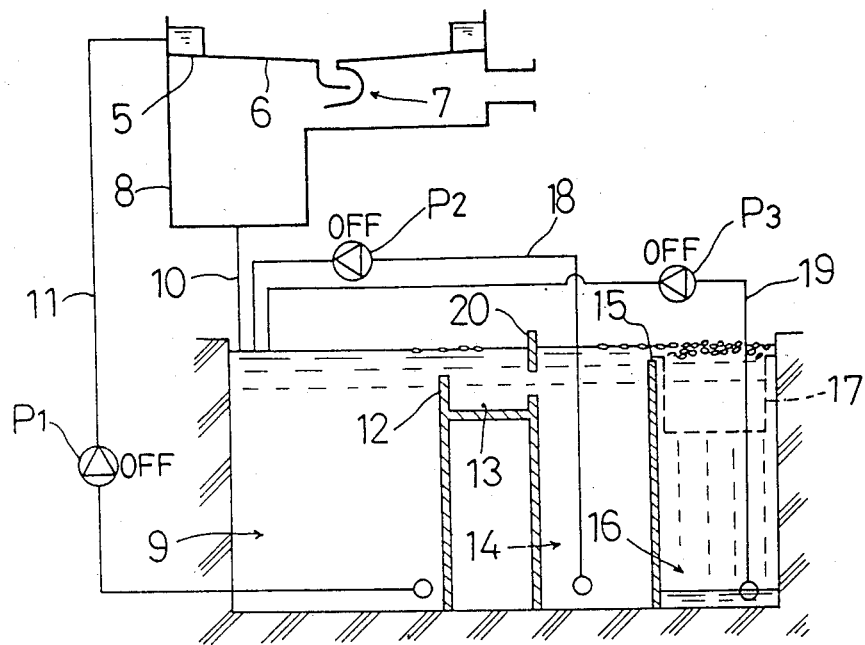
Figure 8D:
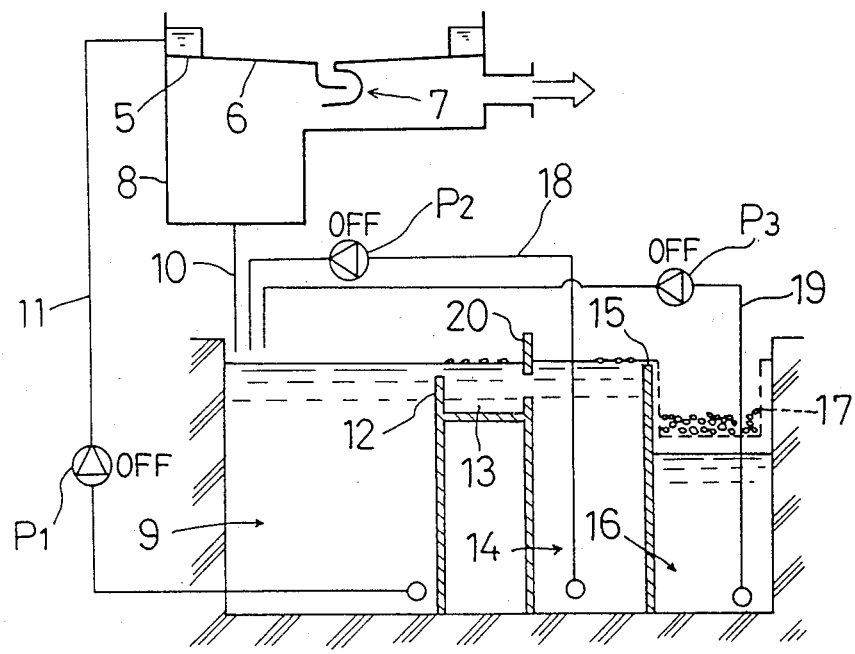
Figure 8:
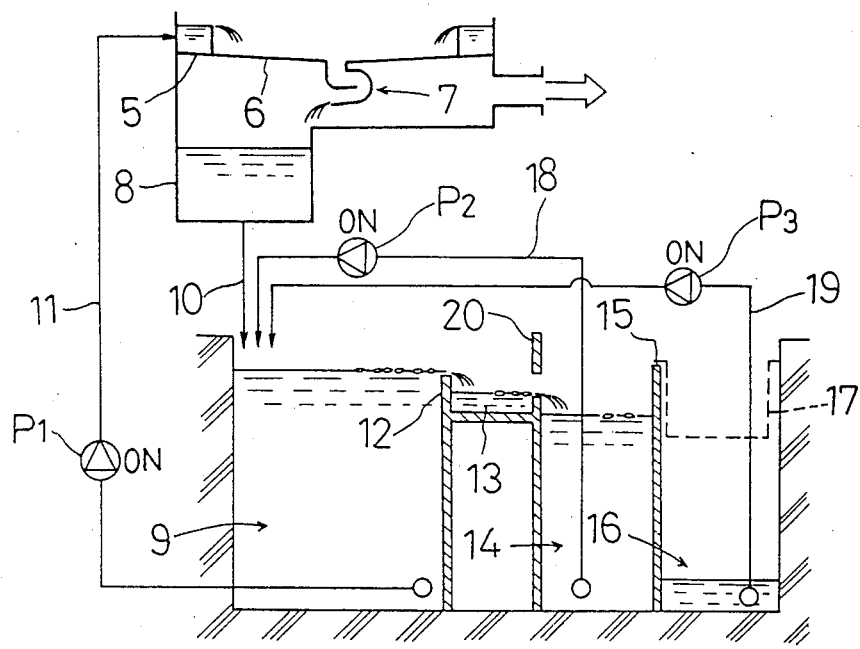

As shown in FIGS. 8 (a) through (e), the second weir 15 has a level higher than the position at which the water overflowing the first weir 12 enters the auxiliary separator tank 14. The second return passage 19 in this embodiment is disposed to return the cleaning water W from the recovery tank 16 to the separator tank 9. The paint waste is separated and collected through the following steps (i) to (iii):

(i) FIG. 8(a) shows a normal operating state, in which the first pump P1 is operated to continuously return the cleaning water W to the cleaning device. Further, the second pump P2 is operated to cause the water to continuously overflow the first weir 12 and carry the floating paint waste from the separator tank 9 to the auxiliary separator tank 14.

(ii) The first pump P1 and second pump P2 are stopped when the spraying booth 1 is put out of operation. The cleaning water W stored in the reservoir 8 of the cleaning device falls to the separator tank 9 to raise the water level in the separator tank 9 and auxiliary separator tank 14. Then, as shown in FIGS. 8 (a) thrugh (d), the water overflows the second weir 15 and carries the floating paint waste from the auxiliary separator tank 14 to the porous collector vessel 17 placed in the recovery tank 16. The paint waste is dewatered at the collector vessel 17.

At this time, the partition plate 20 stops backflow of the paint waste from the auxiliary separator tank 14 to the separator tank 9.

(iii) The normal paint waste collecting operation is resumed when the booth 1 is put to the spraying operation again. As shown in FIG. 8(e), the first pump P1 and second pump P2 are operated to lower the water level in the separator tank 9 and auxiliary separator tank 14 and to allow the water to overflow the first weir 12. The third pump P3 is also operated to return the cleaning water W from the recovery tank 16 to the separator tank 9.

Thus, the paint waste is allowed to accumulate in the auxiliary separator tank 14 and to float and separate from the cleaning water W therein during the spraying operation of the booth. When the booth stops operating for the day, the floating paint waste is collected in the collector vessel 17.

Figure 9:
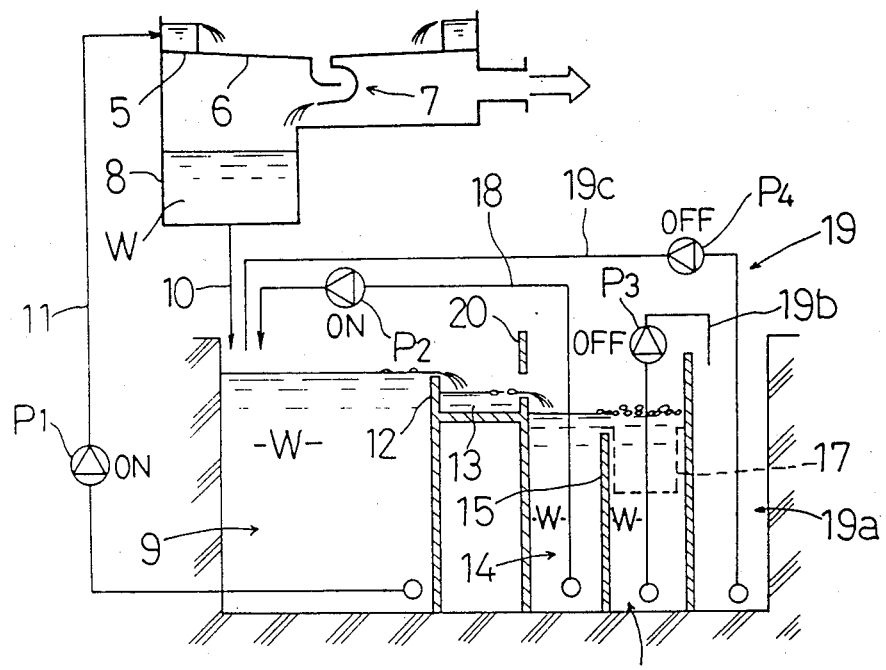
Figure 9:
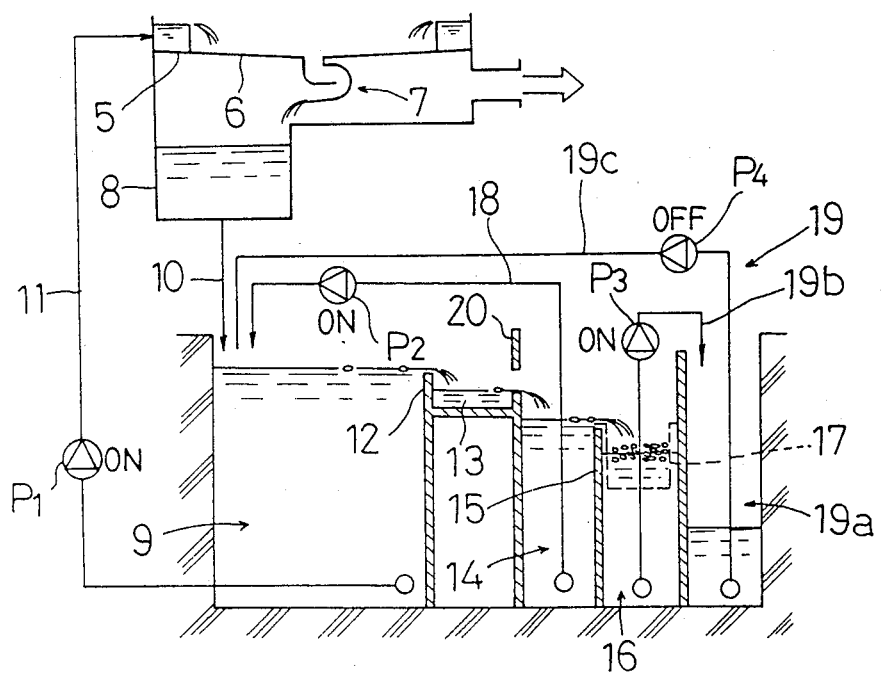
Figure 9:
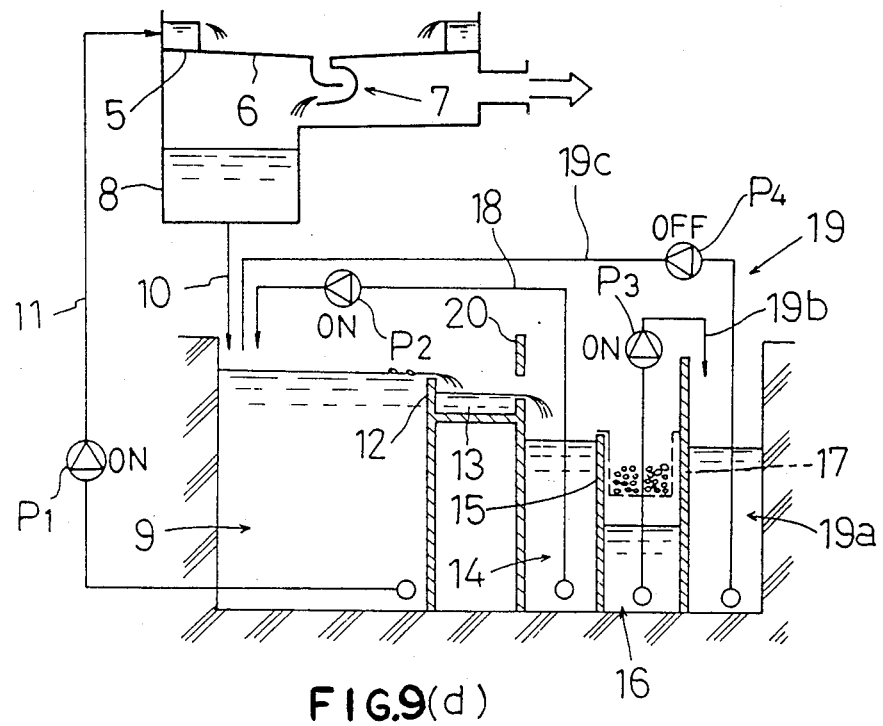
Figure 9:
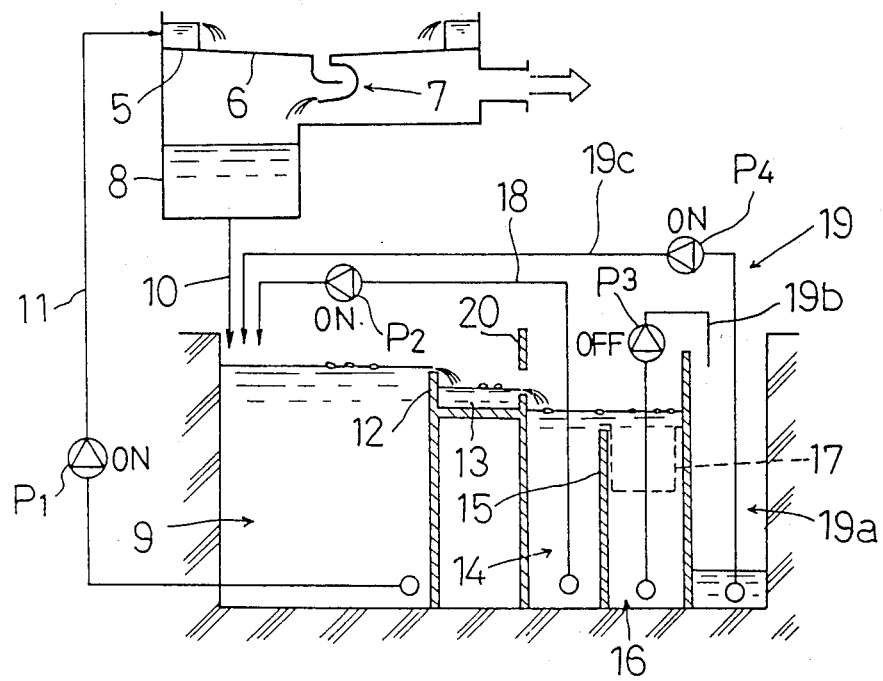

A further embodiment is shown in FIGS. 9 (a) through (e), which includes an auxiliary storage tank 19a for temporarily storing the cleaning water W received from the recovery tank 16, a passage 19a for transferring the cleaning water W from the recovery tank 16 to the auxiliary storage tank 19a by the action of a third pump P3, and a passage 19c for transferring the cleaning water W from the auxiliary storage tank 19a to the separator tank 9 by the action of a fourth pump P4. The passages 19b and 19c and the auxiliary storage tank 19a constitute a second return passage 19 for returning the cleaning water W from the recovery tank 16 to the separator tank 9. The paint waste is separated and collected thruogh the following steps (i) to (iii):

(i) FIG. 9(a) shows a normal operating state, in which the first pump P1 is operated to continuously return the cleaning water W to the cleaning device. Further, the second pump P2 is operated to cause the water to continuously overflow the first weir 12 and carry the floating paint waste from the separator tank 9 to the auxiliary separator tank 14. The water level in the auxiliary separator tank 14 and recovery tank 16 is maintained higher than the second weir 15, whereby the floating paint waste is allowed to accumulate in the auxiliary separator tank 14 and recovery tank 16.

(ii) When a certain amount of floating paint waste has accumulated in the auxiliary separator tank 14 and recovery tank 16, the third pump P3 is operated to lower the water level in the recovery tank 16. As a result, the water overflows the second weir 15 to carry the floating paint waste from the auxiliary separator tank 14 to the recovery tank 16 and the paint waste in the auxiliary separator tank 14 and recovery tank 16 is collected in the collector vessel 17 as shown in FIGS. 9 (b) and (c).

(iii) After the collector vessel 17 is replaced with a new vessel, the third pump P3 is stopped and the fourth pump P4 is operated to return the cleaning water W stored in the auxiliary storage tank 19a to the separator tank 9. This raises the water level in the auxiliary separator tank 14 and recovery tank 16 to return to the normal operation.

As shown in FIGS. 9 (b) through (d), the first pump P1 and second pump P2 are kept running during the step of causing the paint waste in the auxiliary separator tank 14 and recovery tank 16 to be collected in the collector vessel 17, to continuously supply the cleaning water W to the cleaning device and transfer the paint waste from the separator tank 9 to the auxiliary separator tank 14 and recovery tank 16.

As described above, various modifications may be made to the specific cleaning water transfer mode from the separator tank 9 through the first weir 12, auxiliary separator tank 14 and second weir 15 to the recovery tank 16.

Further, instead of the single auxiliary separator tank 14, a plurality of auxiliary separator tanks may be provided in which the cleaning water is allowed to overflow and carry the paint waste from one tank to a next tank.

The foregoing spray waste separating and collecting apparatus is applicable to various types of cleaning device as associated with spraying equipment for removing paint solids and overspray mist by means of cleaning water.

A modified collector vessel 17 used in the paint waste separating and collecting apparatus of the present invention will be described next with reference to FIGS. 10 through 12.

This collector vessel 17 contains a collector bag 22 for receiving the paint waste and water flows therein and permitting the water to pass therethrough, whereby only the paint water is trapped as dewatered in the bag 12.

The collector vessel 17 defines dewatering pores, and the water flowing through the pores is stored in the recovery tank 16 to be returned to the separator tank 9 at an appropriate time by a pump P3.

Number 23 in these drawings indicates a downflow guide for guiding the overflows from the second weir 15 to the collector vessel 17 in a collecting position inside the recovery tank 16.

Figure 10:
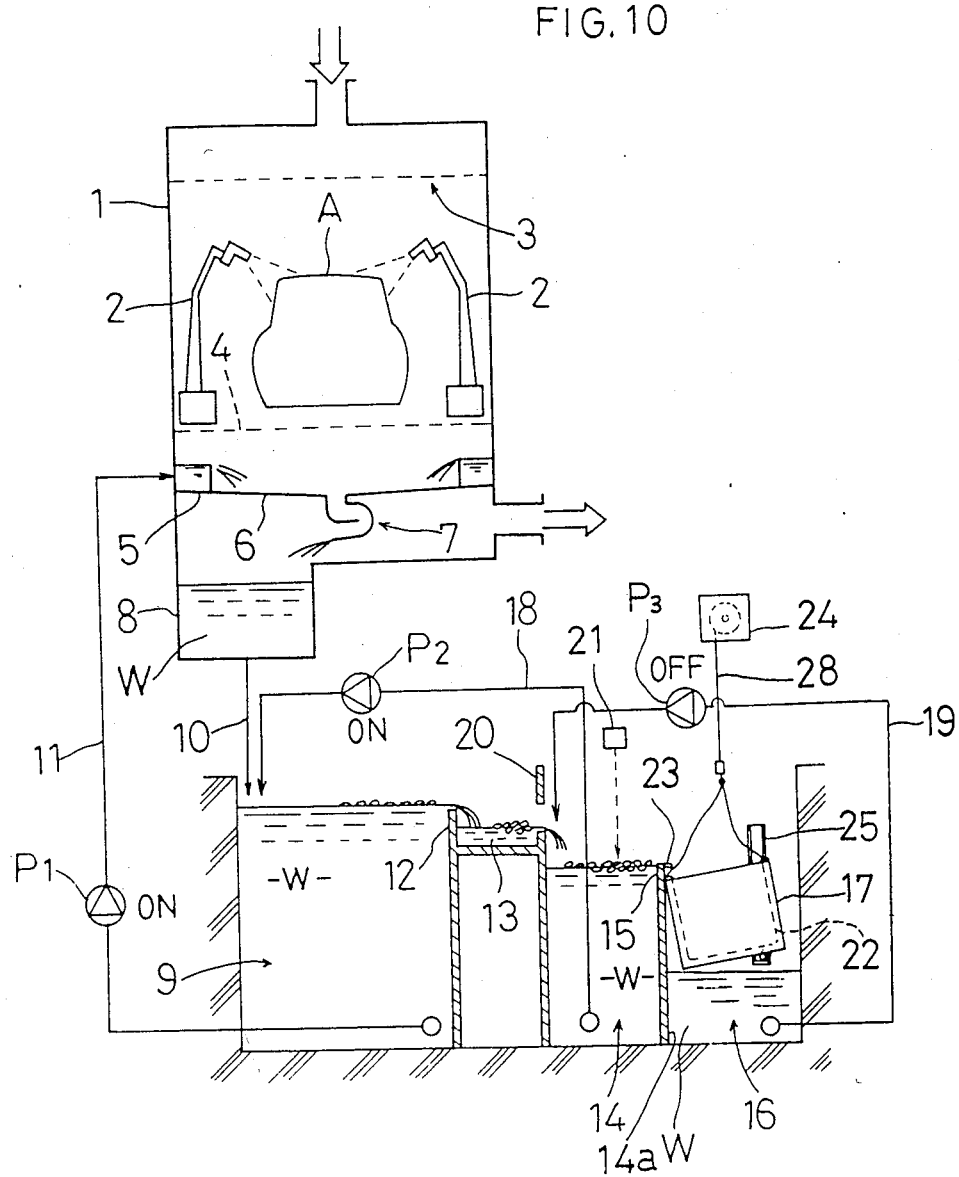
FIG. 10 is a system diagram of a paint waste separating and collecting apparatus employing a modified paint waste collecting device.
Figure 11:
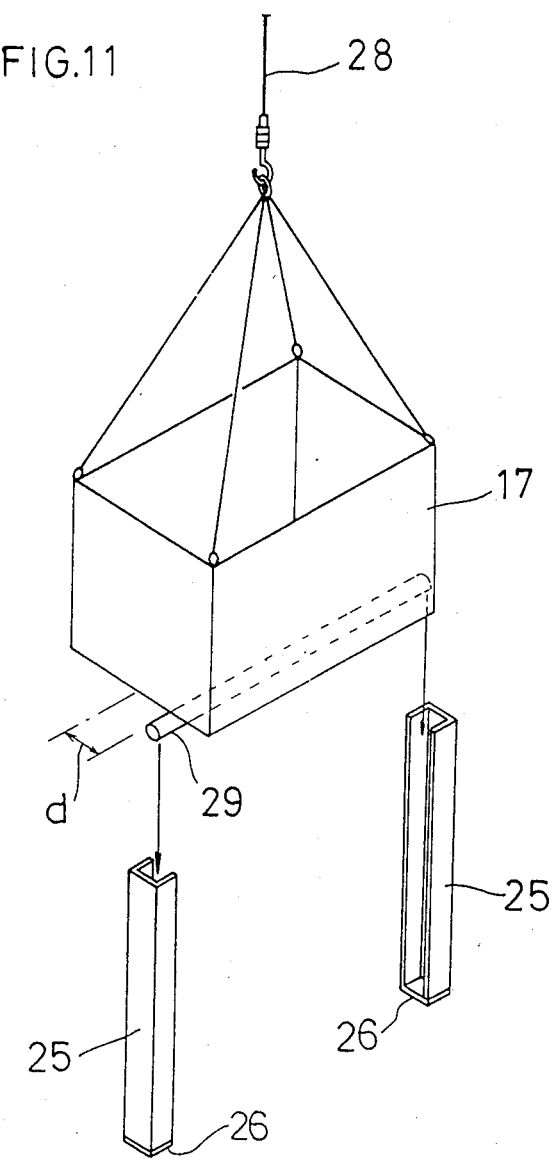
FIG. 11 is a perspective view of a collector vessel of the paint waste collecting device shown in FIG. 10, FIGS. 12 (a) and (b) are explanatory views of the function of the collector vessel shown in FIG. 11.

As shown in FIGS. 10 through 12, the collector vessel 17 is suspended through a wire 28 from a hoisting device 24 such as a winch. The collector vessel 17 is vertically movable between the collecting position inside the recovery tank 16 and a retracted position above the recovery tank 16 for replacing the bag 22 contianing the paint waste with a new bag. A pair of grooved guides 25 are mounted in the recovery tank 16 for guiding the vertical movement of collector vessel 17 while preventing the collector vessel 17 from swinging and scattering water. The collector vessel 17 carries a rod member 29 fixed to a bottom thereof and having opposite ends engaging the grooved guides 25.

Each of the grooved guides 25 defines a first stopper 26 at a lower end thereof to support the collector vessel 17 through contact with the rod member 29. On the other hand, the rod member 29 is offset to one side of the bottom of the collector vessel 17 by a selected distance d from its center to extend along one side wall of the collector vessel 17 having a box shape.

In use, the collector vessel 17 is vertically guided with the rod member 29 engaging the grooved guides 25 and positioned parallel to and opposite the second weir 15 with respect to the center of the bottom of collector vessel 17. Thus, the first stoppers 26 have contact points opposite the second weir 15 across a center of gravity G of the collector vessel 17 is suspension. As the suspended collector vessel 17 is lowered, the first stoppers 26 contact the rod member 29 as shown in FIG. 12(a). As a result, the collector vessel 17 tilts by its own weight because of the positional relationship between the first stoppers 26 and the center of gravity G of the vessel.

The grooved guides 25 define rod guiding tracks spaced a selected distance l from the wall 14a of the auxiliary separator tank 14 or inside wall of the recovery tank 16. This construction allows the collector vessel 17 tilting through contact with the first stoppers 26 to stop at a selected tilt angle by abutment upon the wall of the auxiliary separator tank 14. Thus, the wall of the auxiliary separator tank 14 is used as a second stopper for stopping the tilt of the vessel.

The distance l between the rod guiding tracks and the wall 14a of auxiliary separator tank 14 is determined having regard to an extent to which the downflow guide 23 projects into the recovery tank 16, so that the collector vessel 17 is moved up and down sufficiently clear of the downflow guide 23.

The first stoppers 26 are at a height $h_1$ which is determined having regard to a height H at which the downflow guide 23 is disposed. More particularly, the downflow guide 23 and first stoppers 26 are disposed at such relative positions that the collector vessel 17 tilts through contact with the first stoppers 26 clear fo a projecting end of downflow guide 23 to abut against the wall 14a of auxiliary separator tank 14 whereupon the collector vessel 17 has an edge of a top opening located under the downflow guide 23.

It will be understood from the above that, as the collector vessel 17 suspended from the hoisting device 24 is lowered, the collector vessel 17 tilts itself to a selected angle whereby the projecting end of downflow guide 23 is positioned opposite the top opening of collector vessel 17. This assures that the water and paint waste flow from the downflow guide 23 into the collector vessel 17 without spilling outside.

When the collector vessel 17 is removed from the collecting position as suspended from the hoisting device 24, the collector vessel 17 is erected from the tilting position as shown in FIG. 12(a) and raised clear of the downflow guide 23.

Special consideration is not required for the height of the second stopper since in the above embodiment the wall 14a extending vertically is used as the second stopper. Where an additional element is provided to act as the second stopper for stopping the collector vessel 17 at the selected tilt position, it is necessary to determine heights $h_1$ and $h_2$ of the first and second stoppers having regard to the height H of the downflow guide 23. Then the first and second stoppers and the downflow guide 23 are disposed in such relative positions that the collector vessel 17 in contact with the first stoppers has an edge of the top opening located under the downflow guide 23.

Another example of collector vessel is shown in FIG. 13, in which a plate member 27 bent into an L-shape is fixed at a selected tilt angle and the collector vessel 17 lowered in suspension becomes tilted through contact with a bottom portion 27a of the plate member 27, the tilting thereof being stopped at the selected tilt angle by an upstanding portion 27b of the plate member 27. Thus, the bottom portion 27a and upstanding portion 27a of the plate member 27 act as the first and second stoppers, respectively. In addition to this example, the first and second stoppers may have varied specific shapes and constructions.

The downflow guide 23 may comprise a simple downflow guide plate or various other forms including a hopper.

The hoisting device 24 for raising and lowering the collector vessel 17 in suspension may comprise various types in addition to the winch. The collector vessel 17 may be moved horizontally from the upper removal position.

In the described embodiments, the present invention is employed for the type of paint waste separating and collecting device in which the paint waste is caused to flow from the auxiliary separator tank 14 to the collector vessel 17. The present invention is applicable to the part of the apparatus where the floating paint waste is caused to flow from the separator tank or a corresponding tank to the collector vessel through the downflow guide, regardless of the overall paint waste treating system of the paint waste separating and collecting apparatus.

The fluid for carrying the paint waste may comprise various aqueous solutions or liquid preparations instead of water.

What is claimed is:

1. A paint waste separating and collecting apparatus comprising: a separator tank (9) for receiving cleaning water laden with paint waste discharged from a cleaning device and for causing the paint waste to separate and float from cleaning water held in said tank,
    a circulating passage (11) for supplying cleaning water stripped of the paint waste from the separator tank (9) to the cleaning device,
    a first weir (12) for allowing floating paint waste to flow together with overflow water from said separator tank (9),
    an auxiliary separator tank (14) for receiving the overflow water from said first weir (12),
    a second weir (15) for allowing the floating paint waste to flow together with overflow water from said auxiliary separator tank (14),
    a collector vessel (17) for receiving the overflow water from said second weir (15) and having a plurality of dewatering pores for separating the paint waste from the overflow water,
    a recovery tank (16) for accommodating said collector vessel (17),
    a first return passage (18) for returning cleaning water stripped of the paint waste from said auxiliary separator tank (14) to one of said separator tank (9) and said cleaning device, and
    a second return passage (19) for returning cleaning water stripped of the paint waste from said recovery tank (16) to one of said auxiliary separator tank (14) and said separator tank (9),
    wherein said separator tank (9) has a storage capacity at least ten times larger than said auxiliary separator tank (14), the paint waste being caused to float and separate from the cleaning water reserved in said tank (9) before being flowed over said first weir (12) and said floated and separated paint waste being caused to flow over said first weir (12) by a surface flow (f) toward said first weir (12) generated over a wide region by natural downflow movement of the discharged cleaning water into said separator tank (9).

2. A paint waste separating and collecting apparatus as claimed in claim 1 wherein said collector vessel (17) is suspended from a hoisting device to be vertically movable between a collecting position and an upper removal position.

3. A paint waste separating and collecting apparatus as claimed in claim 2 wherein said recovery tank (16) includes therein a first stopper (26) for supporting said collector vessel (17) in descent and having a contact point positioned opposite said second weir (15) across a center of gravity of said collector vessel (17) as suspended, and a second stopper (14a) for stopping at a selected tilt angle said collector vessel (17) tilting by gravity toward said second weir (15) through contact with said first stopper (26), and wherein said second weir (15) includes a downflow guide (23) for guiding overflows from said second weir (15) to said collector vessel (17), said first and second stoppers (26, 14a) and said downflow guide (23) being arranged in such vertical relative positions that said collector vessel (17) has an edge of a top opening thereof disposed under said downflow guide when said edge is in contact with said second stopper (14a).

4. A paint waste separating and collecting apparatus as claimed in claim 3 wherein said second stopper (14a) comprises a wall of said recovery tank (16) defining said second weir (15).

5. A paint waste separating and collecting apparatus comprising:
a separator tank (9) for receiving cleaning water laden with paint waste and discharged from a cleaning device,
a circulating passage (11) for supplying cleaning water stripped of the paint waste from the separator tank (9) to the cleaning device,
a first weir (12) for allowing floating paint waste to flow together with overflow water from said separator tank (9),
an auxiliary separator tank (14) for receiving the overflow water from said first weir (12),
a second weir (15) for allowing the floating paint waste to flow together with overflow water from said auxiliary separator tank (14),
a collector vessel (17) for receiving the overflow water from said second weir (15) and having a plurality of dewatering pores for separating the paint waste from the overflow water,
a recovery tank (16) for accommodating said collector vessel (17),
a first return passage (18) for returning cleaning water stripped of the paint waste from said auxiliary separator tank (14) to one of said separator tank (9) and said cleaning device, and
a second return passage (19) for returning cleaning water stripped of the paint waste from said recovery tank (16) to one of said auxiliary separator tank (14) and said separator tank (9),
with said collector vessel (17) suspended from a hoisting device to be vertically movable between a collecting position and an upper removal position, and
with said recovery tank (16) including therein a first stopper (26) for supporting said collector vessel (17) in descent and having a contact point positioned opposite said second weir (15) across a center of gravity of said collector vessel (17) as suspended, and a second stopper (14a) for stopping at a selected tilt angle said collector vessel (17) tilting by gravity toward said second weir (15) including a downflow guide (23) for guiding overflows from said second weir (15) to said collector vessel (17) through contact with said first stopper (26), said first and second stoppers (26, 14a) and said downflow guide (23) being arranged in such vertical relative positions that said collector vessel (17) has an edge of a top opening thereof disposed under said downflow guide when said edge is in contact with said second stopper (14a).

6. A paint waste separating and collecting apparatus as claimed in claim 5 wherein said second stopper (14a) comprises a wall of said recovery tank (16) defining said second weir (15).

* * * * *

UNITED STATES PATENT AND TRADEMARK OFFICE
CERTIFICATE OF CORRECTION

PATENT NO. : 4,818,388
DATED : April 4, 1989
INVENTOR(S) : Koji Morioka and Makoto Watanabe It is certified that error appears in the above-identified patent and that said Letters Patent is hereby corrected as shown below:

Title Page under References Cited "3,764,073  10/73  Eisenmann" should read --3,764,013  10/73  Eisenmann--.

Column 3 Line 7 "state" should read --stage--.

Column 3 Line 32 "removal" should read --removing--.

Column 5 Line 65 "truble" should read --trouble--.

Column 6 Line 66 "thrugh" should read --through--.

Column 8 Line 40 "contianing" should read --containing--.

Column 8 Line 61 "is" should read --in--.

Column 9 Line 2 "l" should read --$\ell$--.

Column 9 Line 10 "l" should read --$\ell$--.

Column 9 Line 21 "fo" should read --of--.

Signed and Sealed this
Fifth Day of December, 1989

Attest:

JEFFREY M. SAMUELS

*Attesting Officer*    *Acting Commissioner of Patents and Trademarks*